July 28, 1959
C. C. CLIFTON
2,896,803
STRADDLE TRAILERS
Filed Nov. 12, 1957
4 Sheets-Sheet 1
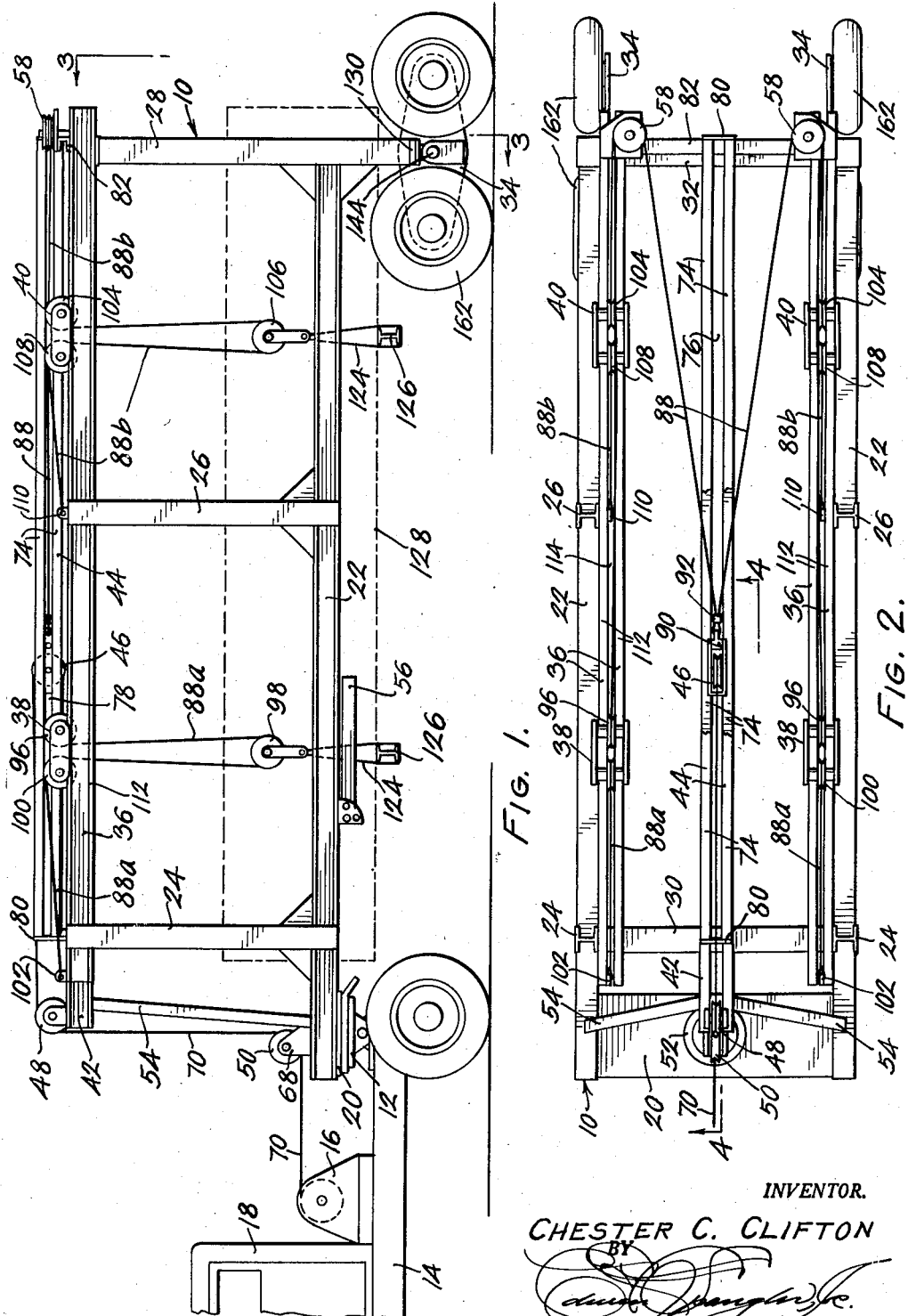
INVENTOR.
CHESTER C. CLIFTON
BY
ATTORNEY

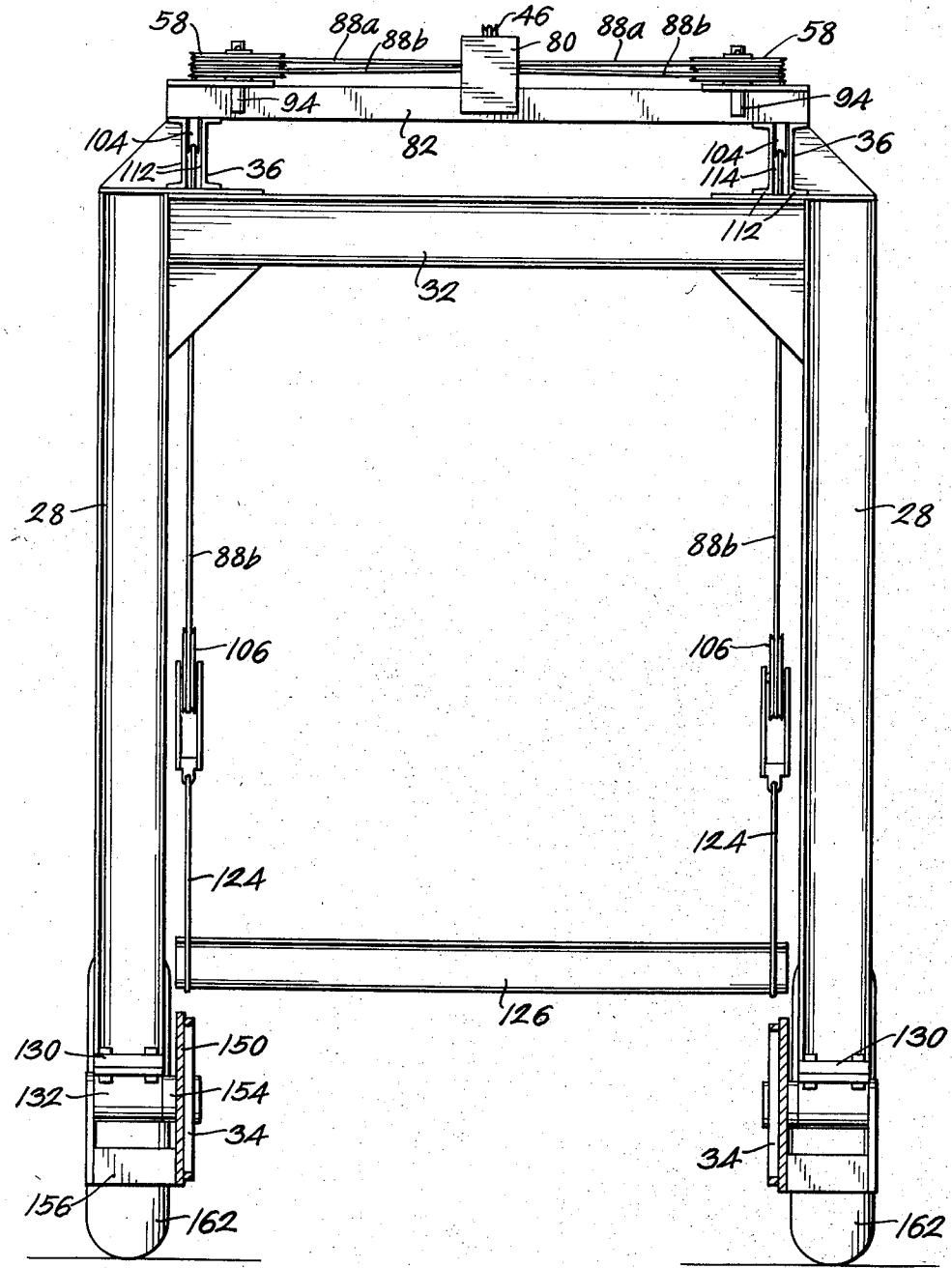

July 28, 1959
C. C. CLIFTON
2,896,803
STRADDLE TRAILERS
Filed Nov. 12, 1957
4 Sheets-Sheet 3
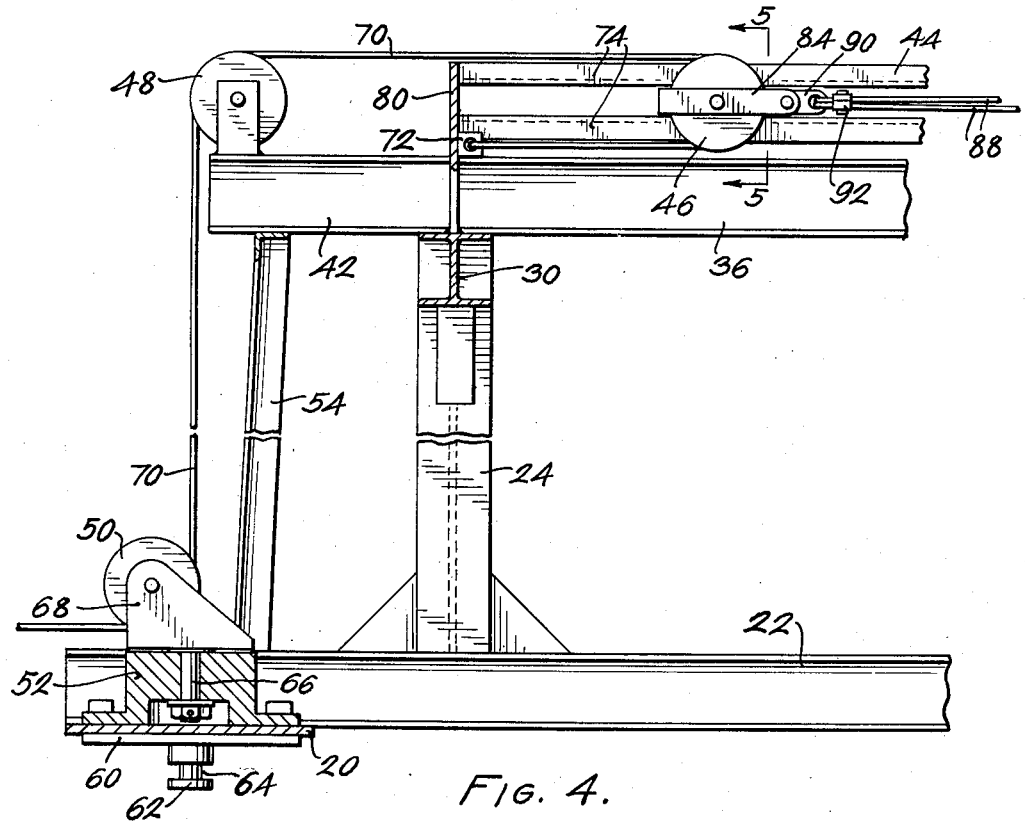
FIG. 4.
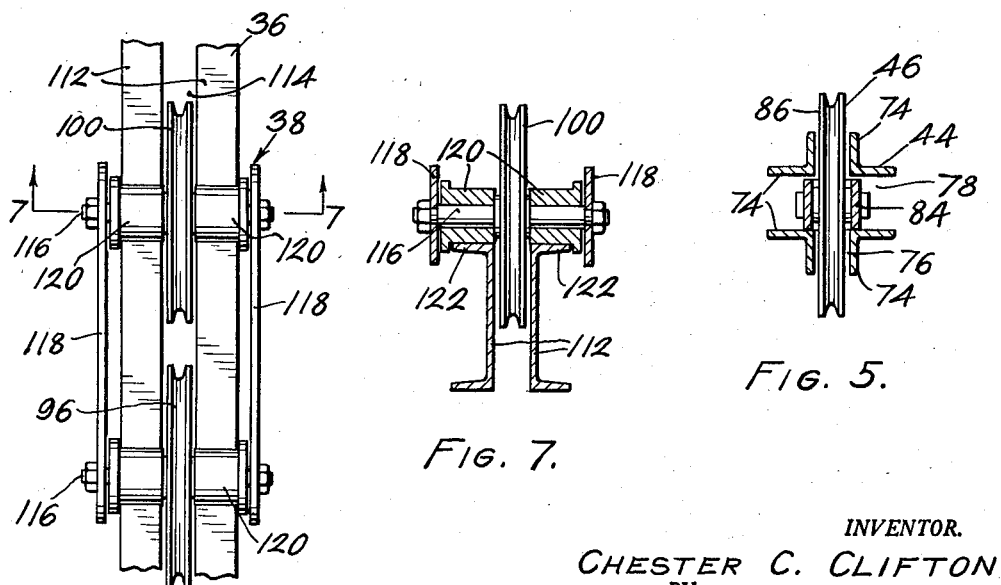
FIG. 6.
FIG. 7.
FIG. 5.
INVENTOR.
CHESTER C. CLIFTON
BY
ATTORNEY July 28, 1959      C. C. CLIFTON      2,896,803
STRADDLE TRAILERS Filed Nov. 12, 1957      4 Sheets-Sheet 4

INVENTOR.
CHESTER C. CLIFTON
BY
ATTORNEY

United States Patent Office 2,896,803
Patented July 28, 1959

2,896,803

STRADDLE TRAILERS

Chester C. Clifton, Denver, Colo., assignor to Mighty Mover Corporation, Denver, Colo., a corporation of Colorado Application November 12, 1957, Serial No. 695,958

14 Claims. (Cl. 214—396)

This invention relates to straddle trailers and is a continuation-in-part of my copending application Serial Number 625,167, which is also directed to vehicles of this same general type.

So-called "straddle-type" vehicles are in rather common use and they are characterized by an open-bottomed body into which the load is hoisted directly from the ground and transported from place to place in this position. Straddle-type vehicles are further characterized by being divided into two basically different styles much in the same manner as ordinary trucks, these styles being those which are self-propelled and those that include no source of power but are drawn by a tractor and can best be identified as "trailers." Both styles of straddle-type vehicles, however, have been found to possess certain weaknesses and disadvantages that have considerably limited their utility for all but a very few specialized applications.

Self-propelled straddle vehicles are rather widely used for carrying brick, lumber and steel; however, in general, their use is limited to short low-speed hauls either in the yard or between two locations that lie quite close to one another. Undoubtedly the most serious disadvantage of the self-propelled straddle vehicle is its high initial expense. These units are designed with extremely complicated chain devices to wheels located on both sides of the load and their hoisting mechanisms are also quite complex. They are incapable of operating at highway speeds and cannot, therefore, be used for long hauls economically. Furthermore, there are very definite limits on the weight, length and type of load that can be handled with these vehicles which explains the fact that their use has been largely confined to the aforementioned specific applications.

The trailer style straddle vehicle on the other hand is, or at least should be, considerably more versatile for several reasons. First of all, it has an entirely separate drive unit or tractor that can be designed and built along the same lines as conventional tractors. These tractors can be made for over-the-road operations at highway speeds. Most important is the fact that steerable drive wheels on the trailer are eliminated. Secondly, the design and structure of the trailer became a function of the loads to be carried rather than the drive, hoisting and steering mechanisms which, with the exception of part of the hoist, are all contained and controlled from the tractor. Further, loads of excessive length, weight and of a difficult-to-handle nature are much more easily hoisted transported and unloaded from a trailer which is easily designed to provide a wide beam and long axle-to-axle distance. Finally, straddle trailers for several different specific hauling applications can be used interchangeably with a single tractor thus eliminating one of the major items of expense in the self-propelled straddle vehicles.

Even though straddle trailers possess many important advantages over the self-propelled straddle vehicles, a few of which have been pointed out above, trailers of this type are not widely used for several reasons. First of all, the prior art straddle trailer hoisting mechanisms have been extremely complicated and expensive devices which made loading and unloading very difficult operations. Several of the prior art designs required special tractors which were other costly and complex additions to the trailers. Perhaps the most important problem, however, was the fact that the pivotal connection required between the tractor and trailer caused the loads to shift, hoisting cables to break and the tractor-trailer unit to become extremely difficult to handle, especially during a turn.

It is, therefore, the principal object of the present invention to provide a novel and improved straddle trailer.

A second object of the invention is to provide a tractor-straddle trailer combination in which a conventional over-the-road high speed tractor is used.

A third object is the provision of a straddle trailer having a considerably simplified hoisting mechanism.

A fourth object of the invention is to provide a tractor-trailer unit in which the trailer may be freely pivoted relative to the tractor without effecting the load even though the winch and power therefor are both carried by the tractor.

An additional object of the invention is the provision of a straddle trailer that is capable of hoisting and transporting a wide variety of irregular loads having excessive weight, length and bulk at highway speeds.

Another object is to provide an improved pivotal connection between a tractor with a winch and a straddle trailer.

Still another object is the provision of a straddle trailer which is easily and simply adapted to use for loading and hauling a plurality of different articles of different shapes, weight distribution and size.

Further objects are to provide a tractor-straddle trailer combination that is simple, relatively inexpensive, rugged, easy to load and unload, versatile and capable of being driven at fast highway speeds for extended hauls.

Other objects will be in part apparent and in part pointed out specifically hereinafter in connection with the description of the drawing that follows, in which:

Figure 1 is a side elevation showing the tractor-straddle trailer combination of the present invention;

Figure 2 is a top plan view of the straddle trailer;

Figure 3 is a section to an enlarged scale taken along line 3—3 of Figure 1;

Figure 4 is an enlarged fragmentary section taken along line 4—4 of Figure 2 showing the pivotal connection between the trailer and fifth wheel of the tractor along with a portion of the hoisting mechanism;

Figure 5 is a section taken along line 5—5 of Figure 4 showing the construction of center rail and pulley mounted therein of the trailer;

Figure 6 is a fragmentary top plan view showing the side rail detail and pulley assembly mounted thereon;

Figure 7 is a section taken along line 7—7 of Figure 6;

Figure 8:
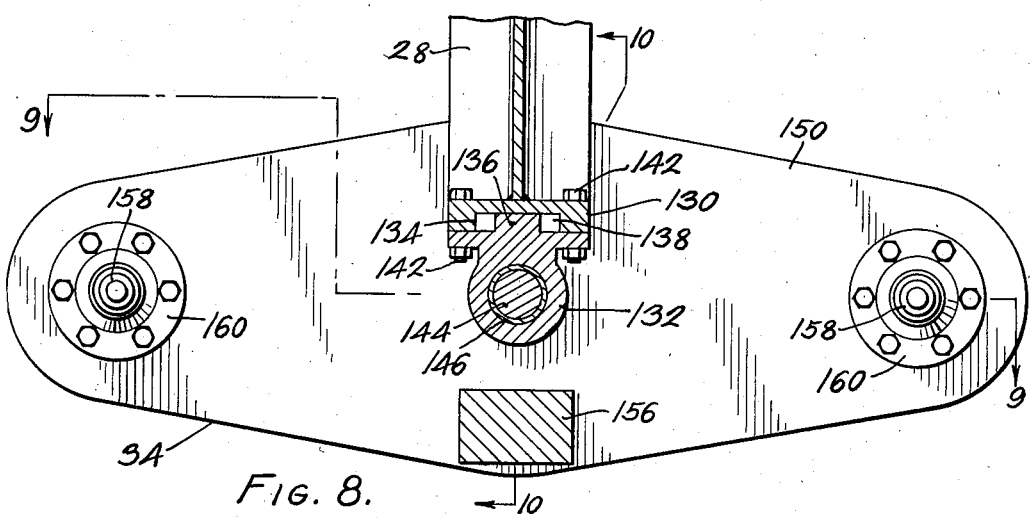
Figure 8 is an enlarged fragmentary elevation of the trailer wheel-support assembly.
Figure 9:
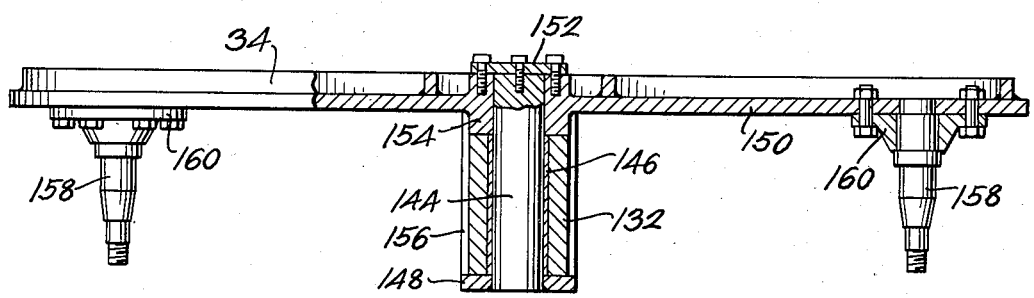
Figure 9 is a section taken along line 9—9 of Figure 8.
Figure 10:
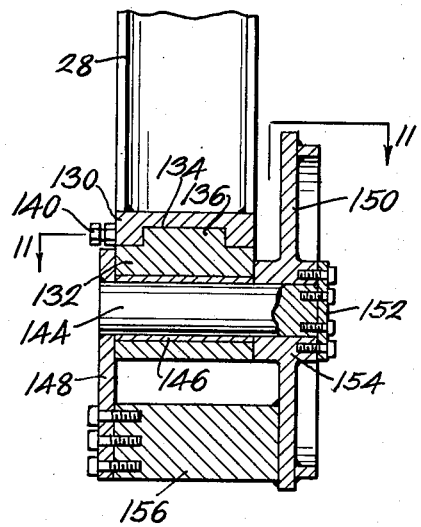
Figure 10 is a section taken along line 10—10 of Figure 8.
Figure 11:
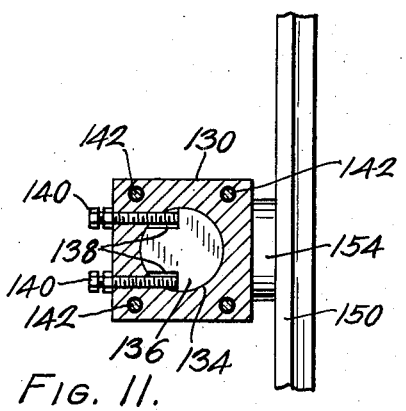
Figure 11 is a section taken along line 11—11 of Figure 10.

Referring now to the drawing, and in particular to Figure 1 thereof, it will be seen that the straddle trailer of the present invention, indicated in a general way by numeral 10, is attached for pivotal movement to the fifth wheel 12 of a conventional tractor 14 of the type having a winch 16 mounted on the bed thereof behind the cab 18. The pivotal connection at the front end of the trailer which has been illustrated and will be described in detail in connection with Figure 4, includes a bed-plate 20 to the extremities of which are welded or otherwise permanently attached lower side frame elements 22 that extend the length of the trailer in spaced substantially parallel relation and are included within the lower frame. Front, intermediate and rear upright frame elements 24, 26 and 28, respectively, are attached in upstanding relation to the lower side frame elements 22 in order to provide supports for the upper frame. Front and rear transverse frame elements 30 and 32, respectively, are attached between the upper ends of transversely spaced upright elements 24 and 28, element 32 being shown most clearly in Figure 3. Rear uprights 28 extend beneath side frame elements 22 and receive the tandem wheel mountings 34 for pivotal movement in a manner that will be set forth in detail in connection with the description of Figures 8 through 11. Spaced substantially parallel side rails 36 extend between the outboard ends of the front and rear transverse frame elements 30 and 32 with front and rear pulley assemblies 38 and 40, respectively, mounted thereon for longitudinal rolling movement. A bracket 42 is mounted on transverse frame member 30. Center rail 44 is mounted on top of the frame in longitudinal alignment therewith and central pulley assembly 46 is positioned within the center rail for movement in the direction of the length thereof.

Upper fixed pulley 48 is attached to the front end of central beam 42 for rotation about a transverse axis and lower fixed pulley 50 is mounted on upper bearing element 52 supported by the bed plate 20 for rotation about a swinging axis. Braces 54 extend between the lower side frame elements 22 and central bracket 42. Foldable legs 56 are attached to the underside of side frame elements 22 near the front end thereof for pivotal movement between the folded position shown and an extended position wherein they provide a support for the front end of the trailer when disconnected from the tractor. Pulleys 58 are arranged in transversely spaced relation at the rear ends of the side rails 36 for rotation about substantially vertical axes.

With reference now to Figures 1, 2 and 4, it can be seen that the lower bearing plate 60 is attached to the underside of bedplate 20 and pivot 62 extends downwardly therefrom on the longitudinal centerline of the trailer at the front end thereof. Pivot 62 is provided with an annular groove 64 which passes into the V-shaped notch (not shown) in the conventional fifth wheel 12 of a tractor and completes the pivotal coupling between the tractor and trailer. Upper bearing element 52 is attached to the top of the bedplate with pivot pin 66 of the mounting 68 for the lower fixed pulley 50 mounted therein for pivotal movement about an axis coincident with the axis about which the trailer pivots relative to the tractor. The axis of pulley 50 within mounting 68, on the other hand, is preferably displaced forwardly a distance approximately equal to the radius of the pulley thus placing winch cable 70 on the common pivot axes of the trailer and bracket or, in other words, the rear extremity of the pulley is substantially tangent to the axis of pivotal movement between the tractor and trailer. This is an extremely important feature of the present invention as the load does not shift due to the lightening or slackening of the winch cable when the trailer pivots relative to the tractor, the tension on the cable and effective length thereof remaining substantially constant. Bracket 68, of course, pivots about pivot pin 66 as the tractor turns remaining substantially perpendicular to the winch.

From the drum of the winch the winch cable 70 passes beneath pulley 50, over the top of upper fixed pulley 48 and around central pulley assembly 46 to a point 72 of fixed attachment on the frame. Rotation of the winch drum in a direction to wind in cable 70 pulls the central pulley assembly to the front end of the center rail 44 thus hauling in the cables attached to the rear end thereof.

Attention is now directed to Figures 1, 2, 4 and 5 wherein the center rail 44 and central pulley assembly 46 have been shown. The center track, in the particular embodiment illustrated, comprises four longitudinally extending elements 74 arranged in transversely spaced and vertically spaced relation to define a vertical pulley-receiving passage 76 and a horizontal cable-receiving passage 78. Elements 74 are attached to endplates 80 at opposite ends thereof which are, in turn, attached to transverse element 30 at the front end and transverse pulley-support beam 82 at the rear end. Pulley block 84 is generally U-shaped and sized to slide along the center rail within cable-receiving passage 78 in a manner such that it is restrained against up-and-down movement. The pulley 86 is journalled for rotation between the spaced legs of the block 84 and within pulley-receiving passage 76 that retrains both the pulley and block against side-to-side movement, the winch cable 70 extends around pulley 86, whereas, cables 88 are attached to connector 90 at the rear end of the pulley block 84 and are secured by cable clamps 92 that maintain an equal length of cable on both sides of the trailer thus preventing the cable from shifting in the case of an unbalanced load.

In Figures 1, 2 and 3 it will be noted that cables 88 pass from the central pulley assembly 46 around pulleys 58 carried on the ends of pulley-support member 82 which extends transversely between the rear ends of side rails 36. In the embodiment illustrated, two cables 88a and 88b are required, one 88a running to front pulley assemblies 38 and the other 88b to rear pulley assemblies 40; hence, a pulley 58 with two grooves is needed on each side of the pulley-support element 82 arranged in stacked relation for rotation about substantially vertical pulley axes defined by pins 94. The cable 88a running in the upper grooves of pulleys 58 extends forwardly along the side rails, over rear pulleys 96 of front assembly 38, around front running blocks 98 and over the front pulleys 100 of assemblies 38 to a point 102 of fixed attachment at the front end of the trailer. The other cable 88b passes around the lower groove of pulleys 58 and similarly over rear pulleys 104 of the rear pulley assemblies 40, around rear running blocks 106 and over front pulleys 108 of the rear assemblies to a fixed point 110 intermediate the ends of the side rails.

In Figures 1, 2, 3, 6 and 7 the side rails 36 will be seen to comprise spaced channels 112 arranged in inch-to-inch relation defining a pulley-receiving passage 114 therebetween. The front and rear pulleys of both the front and rear pulley assemblies 38 and 40 are mounted for rotation on transversely extending axles 116 arranged in longitudinally spaced parallel relation and are connected to one another by sideplates 118. Flanged rollers 120 are mounted on the axles 116 between the sideplates 118 and on opposite sides of the pulleys for rolling movement along the upper flanges 122 of the side rails. The flanged rollers cooperate with the upper flanges on the side rails to prevent transverse movement of the pulley assemblies 38 and 40 thereby maintaining the pulleys centered within pulley-receiving passage 114.

Again referring to Figures 1 through 4, it will be noted that running blocks 98 and 106 as shown are provided with slings 124 which receive the ends of load-supporting beams 126. The load 128, indicated by dotted lines in Figure 1, is supported by beams 126 which project beyond both sides thereof. An examination of Figure 3 will show that the trailer is entirely open along the bottom behind the pivotal connection with the tractor so that the load may be hoisted directly therein. The front pulley assemblies 38 and front running block 98 may be located at any desired point between fixed cable connections 102 and 110 depending upon the length and weight distribution of the load. Likewise, rear pulley assemblies 40 can be located at any point on the side rails between fixed cable connection 110 and the rear end of the trailer. The length of cables 88a and 88b are preferably adjusted at the points of fixed attachment with the trailer such that front and rear running blocks 98 and 106 lie approximately the same distance off the ground. Thus, by merely winding the winch cable 70 onto the winch 16, the central pulley assembly 46 is drawn toward the front of the trailer guided within center track 44 and causing the cables 88a and 88b attached thereto to raise running blocks 98 and 106. Cable clamp 92 prevents the cables 88 from shifting within connector 46 which would be the tendency in the case of an unbalanced load. Certain other important features of the hoist mechanism are worthy of note at this point. The construction by which the portion of cable 70 that extends between pulleys 48 and 50 lies in coaxial relation with the axis of pivotation between the tractor and trailer, as has already been mentioned, is of utmost importance in preventing and shortening or lengthening of the effective length of the cables which would cause the load to shift as the tractor-trailer unit turned a corner. Also, note that the pull between the winch and pulley 50 is substantially horizontal which does away with the tendency for the tractor to lift on its rear wheels instead of the load.

It is clearly understood that the present invention is not to be limited to two pairs of pulley assemblies 38 and 40 as one pair alone will suffice for many loads such as large reels or rolls that can be lifted by supporting members running through their centers. Conversely, three or more pairs of pulley assemblies could be rigged in the same general fashion to accommodate special hauling jobs.

Referring now to Figures 3 and 8 through 11, inclusive, it will be seen that the lower extremity of rear upright frame elements 28 are provided with a mounting bracket 130 to which is bolted a pivot pin housing 132. The underside of the bracket contains a cylindrical depression 134 into which cylindrical projection 136 on the pivot pin housing 132 extends. Projection 136 includes notches 138 at the front and rear portions thereof into which adjusting bolts 140 extend. Bolts 140 are carried by the bracket 130 and provide the means for angular adjustment of the pivot pin housing about a substantially vertical axis in order to properly align the tandem wheel assembly 34 with the tractor wheels. The bolts 142 by which the housing 132 and bracket 130 are attached to one another are, of course, mounted with sufficient play to permit the required relative movement.

Pivot pin 144 is journaled within bushing 146 in the pivot pin housing for rotational movement and is fixedly attached to a face plate 148 which abuts the outside of the housing. A wheel-support plate 150 is non-rotatably attached at a point intermediate the front and rear ends thereof to the inner end of each pivot pin by a backing plate 152 securely bolted to both the pin and plate. The pin is carried within an integral hub 154 formed in the plate, a block 156 depends from the outside face of plate 150 at a point spaced beneath the hub and provides the means by which the face plate 148 and pin 144 are attached within the housing. Axles 158 mounted in flanges 160 are bolted to the outside face of the plates 150 at the front and rear ends thereof spaced from pin 144. Conventional rubber-tired wheels 162 are then mounted for rotation on the axles to complete the tandem assembly which will rock about pivot 144 when passing over bumps or depressions in the road. The tandem wheel assembly that has just been described provides a construction that is well suited for use over rough terrain without jostling the load to the extent it would be if a single-wheel design were used.

Having thus described the several useful and novel features of the straddle trailer of the present invention in connection with the accompanying drawings, it will be seen that the many useful objects for which it was designed have been achieved. Although but one specific form of the invention has been illustrated and described herein, I realize that certain changes and modifications may occur to those skilled in the art within the broad teaching hereof; hence, it is my intention that the scope of protection afforded hereby shall be limited only insofar as said limitations are expressly set forth in the appended claims.

What is claimed is:

1. A trailer to be pivotally attached to the fifth wheel of a tractor carrying a winch comprising, an open-bottomed body adapted to receive a load hoisted vertically therein, supporting wheels at the rear end of the body, connecting means at the front end of the body adapted to effect a pivotal connection with the fifth wheel of a tractor, pulley tracks on top of the body extending in the direction of the length thereof and arranged in spaced relation adjacent each side, pulley assemblies including longitudinally spaced pulley elements mounted on each track for relative rolling movement about substantially horizontal axes, fixed pulley elements mounted at one end of each track for rotation about substantially vertical axes, a first cable having the free ends thereof attached to the body adjacent the other ends of the tracks and the portion between the free ends passing over the pulley assemblies and around the fixed pulley elements, the portions of the first cable lying between the pulley elements of each pulley assembly being drawn downwardly therebetween to provide a return bend, running pulley elements supported within the return bends formed in the first cable, means depending from the running pulley elements for effecting attachment with a load to be hoisted into the body, fixed pulley means mounted at the front end of the body between the sides thereof for rotation about a substantially horizontal axis, pivoted pulley means mounted on the front end of the body for pivotal movement about a substantially vertical axis and rotational movement about a substantially horizontal axis, said pivoted pulley means being located directly behind the tractor winch and in position such that the axis of pivotal movement thereof is coincident with the axis of pivotation between the tractor and trailer, said pivot axis of the pulley means being tangent thereto at a point spaced rearwardly from the axis of rotation, and a second cable operatively connecting that portion of the first cable lying between the fixed pulley elements and extending over the fixed pulley means at the front of the body and under the pivoted pulley means to the winch on the tractor.

2. The device as set forth in claim 1 in which a movable pulley element is mounted on the body for slidable movement along the longitudinal centerline thereof, the second cable passing from the fixed pulley means at the front of the body around said movable pulley element to a point of fixed attachment to the body, and the first cable being attached at the point between the fixed pulley elements to said movable pulley element.

3. In combination, a tractor having a winch and a fifth wheel mounted on the rear end thereof, and a trailer having the front end thereof connected to the fifth wheel of the tractor for pivotal movement about a substantially vertical axis, the trailer providing an open-bottomed body adapted to receive a load hoisted vertically therein and a cable-operated hoisting mechanism operatively connected to the winch on the tractor, said hoisting mechanism including a pulley mounting attached to the front end of the trailer for pivotal movement about an axis coincident with the axis of pivotal movement between the trailer and tractor and a pulley attached within the pulley mounting for rotation about a substantially horizontal axis, the axis of rotation of the pulley being spaced forwardly of the common vertical pivot axes a distance substantially equal to the radius of the pulley, fixed pulley means mounted at the front of the body above the pivoted pulley for rotational movement about a substantially horizontal axis, said fixed pulley means being substantially tangent to the common vertical axes of pivotal movement at a point spaced forwardly of the axis of rotation thereof and a cable passing between the winch and cable-operated hoisting mechanism along the underside of the pivoted pulley and along the upper side of the fixed pulley.

4. A trailer to be attached to a tractor having a winch thereon comprising, an open-bottomed body adapted to receive a load hoisted vertically therein, wheeled supporting means at the rear end of the body which comprises a wheel-support plate mounted on both side of the body for rockable movement about a centrally located substantially horizontal axis with wheels arranged in tandem relation, one behind the other on the wheel support plate on opposite sides of rockable movement, said wheel-support plates being further mounted on the body for limited angular adjustment about a substantially vertical axis, connecting means at the front end of the body adapted for attachment to the rear end of a tractor for pivotal movement about a substantially vertical pivot axis, pulley mounting means attached to the connecting means for pivotal movement about an axis substantially coincident with the axis of pivotal movement between the tractor and trailer, pulley means connected within the pulley mounting means for rotational movement about a substantially horizontal axis, said pulley means being tangent to the common vertical pivot axes at a point spaced to the rear of the axis of rotation, cable-operated hoisting means mounted in the body in position to connect with a load and hoist the same therein, and cable means connected between the winch and hoisting means and passing under the pulley means operative upon actuation of the winch to raise and lower a load within the body.

5. The device as set forth in claim 4 in which the cable-operated hoisting means includes block and tackle means supported on the top of the body in position to connect with and raise a load.

6. The device as set forth in claim 4 in which the cable-operated hoisting means comprises, rolling pulley blocks supported on opposite sides of the body for movement in the direction of the length thereof, running pulley blocks operatively depending from each rolling pulley block in position to connect with and lift a load into the body, and second cable means operatively interconnecting the running pulley blocks and the rolling pulley blocks with the first-mentioned cable means and the winch.

7. The device as set forth in claim 4 in which the cable-operated hoisting means includes a central fixed pulley means mounted at the front of the body above the pivoted pulley for rotational movement about a substantially horizontal axis, central movable pulley means supported on top of the body for movement along the longitudinal centerline thereof, the cable means passing from the winch and pivoted pulley over the central fixed pulley means and around the central movable pulley means to a point of fixed attachment with the body, and block and tackle means supported on top of the body and operatively connected to the central movable pulley means.

8. The device as set forth in claim 5 in which the block and tackle means includes a rolling pulley block mounted on each side of the body for movement in the direction of the length thereof and a running pulley block operatively depending from each rolling pulley block for upward and downward movement relative thereto.

9. A trailer to be attached to a tractor having a winch thereon comprising, an open-bottomed body adapted to receive a load hoisted vertically therein, wheeled supporting means at the rear end of the body, connecting means at the front end of the body adapted for attachment to the rear end of a tractor for pivotal movement about a substantially vertical pivot axis, pulley mounting means attached to the connecting means for pivotal movement about an axis substantially coincident with the axis of pivotal movement between the tractor and trailer, pulley means connected within the pulley mounting means for rotational movement about a substantially horizontal axis, said pulley means being tangent to the common vertical pivot axes at a point spaced to the rear of the axis of rotation, cable-operated hoisting means mounted in the body in position to connect with a load and hoist same therein, said hoisting means including a central fixed pulley mounted at the front of the body above the pivoted pulley for rotational movement about a substantially horizontal axis, a central movable pulley mounted on top of the body for movement in the direction of the length thereof, first cable means passing from the winch and pivoted pulley around the central movable pulley means to a point of fixed attachment with the body, block and tackle means supported on top of the body including rolling pulley blocks supported on opposite sides of the body for movement in the direction of the length thereof, running pulley blocks operatively depending from each rolling pulley block in position to connect with and lift a load into the body, fixed pulleys mounted on top of the body behind each rolling pulley block for rotational movement about substantially vertical axes and second cable means extending from points of fixed attachment to the body through the rolling pulley blocks, around the running pulley blocks and across the fixed pulleys to a point of attachment with the central movable pulley, said cables and hoisting means coacting to raise and lower a load within the body upon actuation of the winch.

10. The device as set forth in claim 9 in which the body includes spaced substantially parallel tracks arranged on the sides of the top in position to support the rolling blocks for longitudinal movement.

11. The device as set forth in claim 9 in which the body includes a central track extending longitudinally along the centerline thereof, and the central movable pulley means is mounted therein for longitudinal slidable movement.

12. A trailer to be attached to a tractor having a winch thereon comprising, an open-bottomed body adapted to receive a load hoisted vertically therein, wheeled supporting means at the rear end of the body, connecting means at the front end of the body adapted for attachment to the rear end of a tractor for pivotal movement about a substantially vertical pivot axis, pulley mounting means attached to the connecting means for pivotal movement about an axis substantially coincident with the axis of pivotal movement between the tractor and trailer, pulley means connected within the pulley mounting means for rotational movement about a substantially horizontal axis, said pulley means being tangent to the common vertical pivot axes at a point spaced to the rear of the axis of rotation, cable-operated hoisting means mounted in the body in position to connect with a load and hoist same therein including a central fixed pulley means mounted at the front of the body above the pivoted pulley for rotational movement about a substantially horizontal axis, central movable pulley means supported on top of the body for movement along the longitudinal centerline thereof, first cable means passing from the winch and pivoted pulley over the central fixed pulley means and around the central movable pulley means to a point of fixed attachment with the body, block and tackle means supported on top of the body and operatively connected to the central movable pulley means which includes rolling pulley blocks mounted in opposite sides of the body for movement in the direction of the length thereof, each rolling pulley block having longitudinally spaced pulleys interconnected with one another for rotation about substantially horizontal axes, and running pulley blocks depending from each rolling pulley block for up and down movement relative thereto, fixed pulleys mounted on the rear end of the body behind each rolling pulley block and second cable means extending from the central movable pulley means around the fixed pulleys on the rear end of the body, over one pulley of the rolling pulley blocks around the running pulley block, and over the second pulley of the rolling pulley blocks to a point of fixed attachment with the body.

13. The device as set forth in claim 12 in which the body includes a central track extending longitudinally along the centerline thereof, and the central movable pulley means is mounted therein for longitudinal slidable movement.

14. The device as set forth in claim 12 in which the central fixed pulley means is substantially tangent to the common vertical axes of pivotal movement at a point spaced forwardly of the axis of rotation thereof, References Cited in the file of this patent

UNITED STATES PATENTS

| | | |
|---|---|---|
| 1,255,193 | Madden et al. | Feb. 5, 1918 |
| 1,912,645 | Le Tourneau | June 6, 1933 |
| 2,058,473 | Le Tourneau | Oct. 27, 1936 |
| 2,240,564 | Le Tourneau | May 6, 1941 |
| 2,709,087 | Jenkins et al. | May 24, 1955 |

FOREIGN PATENTS

| | | |
|---|---|---|
| 135,212 | Australia | Nov. 10, 1949 |